United States Patent
Hayashi

(10) Patent No.: US 9,500,874 B2
(45) Date of Patent: Nov. 22, 2016

(54) LIQUID CRYSTAL OPTICAL ELEMENT AND IMAGE DISPLAY APPARATUS INCLUDING THE SAME

(71) Applicant: Panasonic Corporation, Osaka (JP)

(72) Inventor: Katsuhiko Hayashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/193,856

(22) Filed: Feb. 28, 2014

(65) Prior Publication Data

US 2014/0176835 A1 Jun. 26, 2014

Related U.S. Application Data

(63) Continuation of application No. PCT/JP2013/002693, filed on Apr. 22, 2013.

(30) Foreign Application Priority Data

Apr. 26, 2012 (JP) .................. 2012-101112

(51) Int. Cl.
G02B 27/22 (2006.01)
G02F 1/1337 (2006.01)
G02F 1/1335 (2006.01)

(52) U.S. Cl.
CPC ....... *G02B 27/2242* (2013.01); *G02B 27/2214* (2013.01); *G02F 1/133504* (2013.01); *G02F 1/133711* (2013.01); *G02F 1/133788* (2013.01);
(Continued)

(58) Field of Classification Search
CPC ............ G02F 2001/133742; G02F 1/133788; G02F 2001/133746; G02F 1/133526; G02F 2001/133607; G02F 1/133711; G02F 1/133504; G02F 2001/133715; G02B 27/2242; G02B 27/2214
See application file for complete search history.

(56) References Cited

U.S. PATENT DOCUMENTS 6,169,594 B1 * 1/2001 Aye et al. ................ 349/196
6,965,421 B2 * 11/2005 Tsuchiya .......... G02F 1/133788
349/123
(Continued)

FOREIGN PATENT DOCUMENTS

JP 2001-074935 3/2001
JP 2001-092367 A 4/2001
(Continued)

OTHER PUBLICATIONS

Toko et al., Image Display System, Machine Translation of JP 2011-175147 A from JPO AIPN Website, All Pages.*

(Continued)

*Primary Examiner* — Dennis Y Kim
(74) *Attorney, Agent, or Firm* — Renner, Otto, Boisselle & Sklar, LLP

(57) ABSTRACT

A liquid crystal optical element according to the present disclosure includes: a prism array composed of a plurality of prisms that have ridge lines extending in a first direction and are arranged in a second direction orthogonal to the first direction; a liquid crystal layer provided on the prism array; and an electrode via which a voltage is applied to the liquid crystal layer. When the voltage applied to the liquid crystal layer is 0 volt, long axes of liquid crystal molecules of the liquid crystal layer are oriented so as to be inclined at a predetermined angle relative to the first direction in a plane orthogonal to the second direction.

7 Claims, 6 Drawing Sheets

(52) U.S. Cl.
CPC ............ *G02F 2001/133715* (2013.01); *G02F 2001/133746* (2013.01)

(56) References Cited

U.S. PATENT DOCUMENTS

| | | | |
|---|---|---|---|
| 7,561,217 B2* | 7/2009 | Hu et al. .......................... | 349/15 |
| 7,929,094 B2* | 4/2011 | Kawamura ........... | B29C 59/046 |
| | | | 349/123 |
| 2007/0146595 A1* | 6/2007 | Watanabe .............. | G02B 5/045 |
| | | | 349/117 |
| 2008/0225201 A1* | 9/2008 | Hoshi ............... | G02F 1/133606 |
| | | | 349/62 |
| 2010/0157026 A1 | 6/2010 | Reichelt | |
| 2011/0234572 A1* | 9/2011 | Toko ............................ | 345/211 |
| 2011/0242443 A1 | 10/2011 | Choi et al. | |

FOREIGN PATENT DOCUMENTS

| | | |
|---|---|---|
| JP | 2005-302676 | 10/2005 |
| JP | 2009-238627 | 10/2009 |
| JP | 2010-529485 A | 8/2010 |
| JP | 2011-175147 A | 8/2011 |
| JP | 2011-221505 A | 11/2011 |

OTHER PUBLICATIONS

International Search Report for corresponding International Application No. PCT/JP2013/002693 mailed May 21, 2013.
Form PCT/ISA/237 for corresponding International Application No. PCT/JP2013/002693 dated May 21, 2013.

* cited by examiner

LIQUID CRYSTAL OPTICAL ELEMENT AND IMAGE DISPLAY APPARATUS INCLUDING THE SAME

CROSS REFERENCE TO RELATED APPLICATION

The disclosures of Japanese Patent Application No. 2012-101112 filed on Apr. 26, 2012 and International Application No. PCT/JP2013/002693 filed on Apr. 22, 2013, which claims priority to this Japanese Patent Application, are incorporated herein by reference.

BACKGROUND

1. Field

The present disclosure relates to a liquid crystal optical element which deflects light incident thereon, and an image display apparatus including the same.

2. Description of the Related Art

Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, the optical refraction behavior by a deflection means is changed so as to follow the eye positions of the observers. The deflection means is composed of electrowetting cells containing two types of immiscible liquids. When a voltage is applied to the electrowetting cells, the interface between the liquids is changed, whereby a prism function is realized by the electrowetting cells.

SUMMARY

The present disclosure provides a liquid crystal optical element that is able to deflect light incident thereon so as to follow the position of an observer and is able to suppress reduction of the intensity of light that reaches the eyes of the observer, regardless of the position of the observer; and an image display apparatus including the same.

A liquid crystal optical element according to the present disclosure includes: a prism array composed of a plurality of prisms that have ridge lines extending in a first direction and are arranged in a second direction orthogonal to the first direction; a liquid crystal layer provided on the prism array; and an electrode via which a voltage is applied to the liquid crystal layer. When the voltage applied to the liquid crystal layer is 0 volt, long axes of liquid crystal molecules of the liquid crystal layer are oriented so as to be inclined at a predetermined angle relative to the first direction in a plane orthogonal to the second direction.

The present disclosure is effective to realize a liquid crystal optical element that is able to deflect light incident thereon so as to follow the position of an observer and is able to suppress reduction of the intensity of light that reaches the eyes of the observer, regardless of the position of the observer; and an image display apparatus including the same.

DETAILED DESCRIPTION

Figure 1:
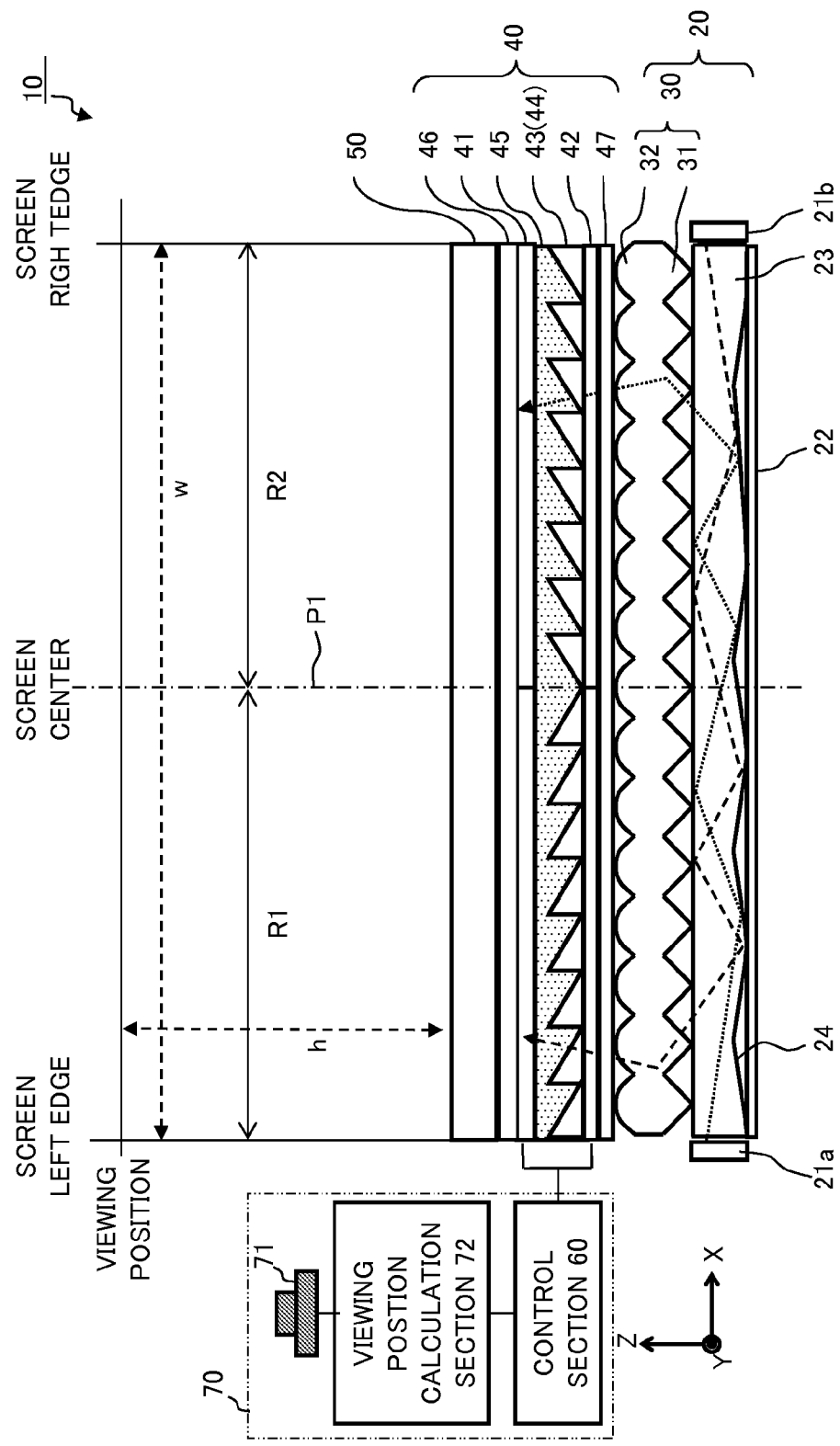
FIG. 1 is a schematic configuration diagram of an image display apparatus according to an embodiment.

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art. Furthermore, in the drawings, principal components are schematically illustrated for easy understanding.

The inventor provides the following description and the accompanying drawings in order to allow a person of ordinary skill in the art to sufficiently understand the present disclosure, and the description and the drawings are not intended to restrict the subject matter of the scope of the patent claims.

<1. Configuration of Image Display Apparatus>

Figure 2:
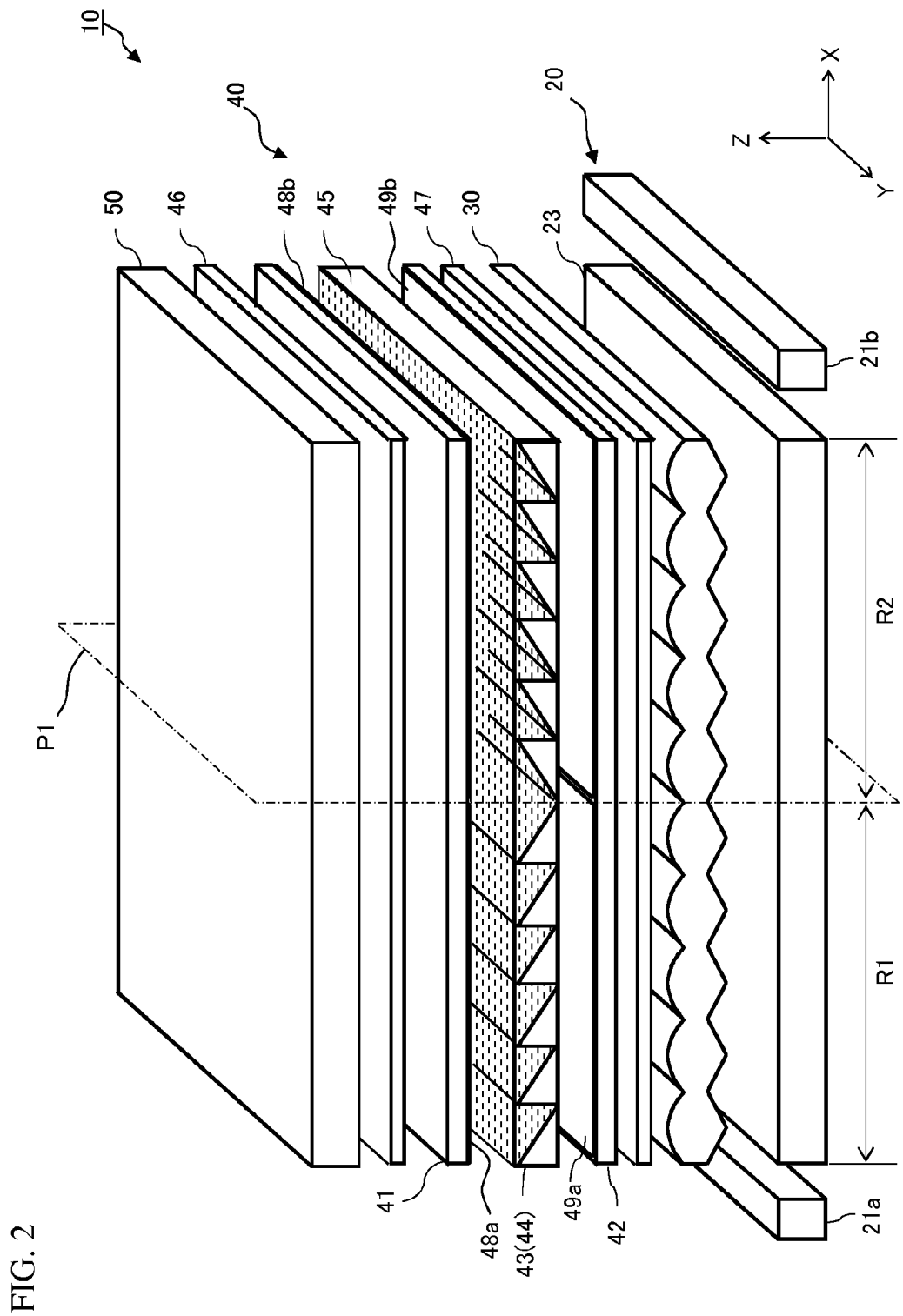
FIG. 2 is an exploded perspective view of a portion of the image display apparatus.

FIG. 1 is a schematic cross-sectional view of an image display apparatus 10 according to an embodiment, and FIG. 2 is an exploded perspective view of a portion of the image display apparatus 10 shown in FIG. 1. It is noted that in FIG. 1, illustration of electrodes 48a, 48b, 49a, and 49b shown in FIG. 2 is omitted.

In the present embodiment, a three-dimensional orthogonal coordinate system is set for the image display apparatus 10, and a direction is specified by using the coordinate axes. As shown in FIGS. 1 and 2, an X axis direction coincides with a right-left direction (horizontal direction) when an observer faces a display surface of an image display panel 50. A Y axis direction coincides with an up-down direction when the observer faces the display surface of the image display panel 50. A Z axis direction coincides with a direction perpendicular to the display surface of the image display panel 50. Here, "facing" means that the observer is located directly in front of the display surface such that, for example, when a letter of "A" is displayed on the display surface, the observer sees the letter of "A" from a correct direction. In addition, FIGS. 1 and 2 correspond to views as seen from above the image display apparatus 10. Thus, the left side in FIGS. 1 and 2 corresponds to the right side of the display screen when the observer sees the display screen.

The image display apparatus 10 includes a light source switching type backlight 20, a liquid crystal prism element 40, the image display panel 50 which displays an image for right eye and an image for left eye while alternately switching between the image for right eye and the image for left eye, a position detection section 70 which detects the position of an observer who uses the image display apparatus 10, and a control section 60 which controls a liquid crystal driving voltage outputted to the liquid crystal prism element 40, on the basis of information of the detected position of the observer.

The image display apparatus 10 switches between light sources 21a and 21b in synchronization with switching between the image for right eye and the image for left eye. In addition, when the switching between the image for right eye and the image for left eye is performed at a frequency equal to or higher than 120 Hz, the observer can recognize a stereoscopic image on the basis of the image for right eye and the image for left eye.

Hereinafter, each component will be described in detail.

<2. Configuration of Backlight>

The backlight 20 includes the light sources 21a and 21b facing each other, a reflection film 22, a light guide plate 23, and a light control film 30. The reflection film 22 is provided on a lower surface side (back surface side) of the light guide plate 23, and the light control film 30 is provided on an upper surface side (front surface side) of the light guide plate 23.

The light sources 21a and 21b are arranged so as to extend along a pair of side surfaces, respectively, of the light guide plate 23, and face each other in the X axis direction. The light source 21a is located at the left side surface of the light guide plate 23, and the light source 21b is located at the right side surface of the light guide plate 23. Each of the light sources 21a and 21b has a plurality of LED elements arranged in the Y axis direction. Each of the light sources 21a and 21b alternately repeats lighting-up and going-out in synchronization with switching between the image for right eye and the eye image for left eye which are displayed on the image display panel 50. In other words, when the image display panel 50 displays the image for right eye, the light source 21a lights up and the light source 21b goes out, and when the image display panel 50 displays the image for left eye, the light source 21a goes out and the light source 21b lights up.

Light emitted from the light sources 21a and 21b spreads within the light guide plate 23 while being repeatedly totally reflected at the upper surface and the lower surface of the light guide plate 23. Light having an angle exceeding the total reflection angle within the light guide plate 23 is emitted from the upper surface of the light guide plate 23. The lower surface of the light guide plate 23 is composed of a plurality of inclined surfaces 24 as shown in FIGS. 1 and 2. By these inclined surfaces 24, light propagating within the light guide plate 23 is reflected in various directions, and thus the intensity of the light emitted from the light guide plate 23 becomes uniform across the entire upper surface.

The reflection film 22 is provided on the lower surface side of the light guide plate 23. Light having an angle exceeding the total reflection angles of the inclined surfaces 24 provided in the lower surface of the light guide plate 23 is reflected by the reflection film 22, enters the light guide plate 23 again, and is eventually emitted from the upper surface. The light emitted from the light guide plate 23 is incident on the light control film 30.

On a lower surface of the light control film 30, a plurality of prisms 31 each having a triangular cross section and a ridge line extending in the Y axis direction are aligned along the X axis direction. In other words, on the lower surface of the light control film 30, the prisms 31 each having a triangular cross section are arranged in a one-dimensional array. In addition, on an upper surface of the light control film 30, a plurality of cylindrical lenses 32 extending in the Y axis direction are aligned in the X axis direction. In other words, a lenticular lens is formed on the upper surface of the light control film 30.

The light incident on the lower surface of the light control film 30 is refracted toward the Z axis direction by the prisms 31, converged by the lenticular lens located on the upper surface, and is incident on the liquid crystal prism element 40.

<3. Configuration of Liquid Crystal Prism Element>

As shown in FIGS. 1 and 2, the liquid crystal prism element 40 includes a substrate 41, a substrate 42, a prism array 44 composed of a plurality of prisms 43, a liquid crystal layer 45, the electrodes 48a and 48b, and the electrodes 49a and 49b.

The substrate 41 and the substrate 42 are arranged so as to face each other.

The prism array 44 is formed on an inner surface of the substrate 41 (a surface on a side facing the substrate 42). The prism array 44 is composed of the plurality of prisms 43. The plurality of prisms 43 are aligned in the X axis direction (an example of a second direction).

Each of the prisms 43 has a substantially triangle-shaped cross section in an XZ plane. In the present embodiment, the cross section of each of the prisms 43 is a right triangle. As shown in FIG. 1, the prisms 43 are configured such that the oblique side of each prism 43 (the opposite side with respect to the right angle of the right triangle) is in contact with the liquid crystal layer 45 when being seen from the Y axis direction.

In addition, as shown in FIG. 2, each of the prisms 43 is formed in a shape extending in the Y axis direction (an example of a first direction). In other words, each of the prisms 43 is formed in a triangular pole shape.

The electrode 48a and the electrode 48b are formed between the substrate 41 and the liquid crystal prism element 40. In addition, the electrode 49a and the electrode 49b are formed between the substrate 42 and the liquid crystal prism element 40. The liquid crystal layer 45 is formed between the substrate 41 and the substrate 42. Specifically, the liquid crystal layer 45 is in contact with the electrode 48a, the electrode 48b, and the prism array 44 on the substrate 41 side.

It is noted that although each of the prisms 43 is formed in a shape extending the Y axis direction in the present embodiment, each of the prisms 43 may be formed in a shape extending in a direction inclined at a predetermined angle relative to the Y axis. With such a configuration, occurrence of moiré (interference fringes) can be reduced. Moiré is a striped pattern that occurs visually due to a difference between the cycles of a plurality of periodic structures when the periodic structures are overlaid. In the present embodiment, since a plurality of periodic structures such as an arrangement of pixels of the image display panel 50, the light control film 30 (the prisms 31 and the cylindrical lenses 32), and the liquid crystal prism element 40 (the prism array 44) are overlaid, moiré is likely to occur. However, when each prism is formed in a shape extending in a direction inclined at a predetermined angle relative to the Y axis, moiré can be made unlikely to occur.

Furthermore, although each electrode is formed between the substrate and the prism array in the present embodiment, each electrode may be formed on a surface opposite to the prism array. Moreover, although the prism array and the substrate are configured as separate components in the present embodiment, the prism array and the substrate may be formed so as to be integrated with each other.

The liquid crystal prism element 40 controls a deflection direction such that the light that is emitted from the left-side light source 21a and incident thereon through the light guide plate 23 and the light control film 30 is converged at the position of the right eye of the observer.

In addition, the liquid crystal prism element 40 controls a deflection direction such that the light that is emitted from the right-side light source 21b and incident thereon through the light guide plate 23 and the light control film 30 is converged at the position of the left eye of the observer.

As understood from FIGS. 1 and 2, the plurality of prisms 43 are provided on the electrodes 49a and 49b so as to be aligned in the X axis direction. Cross-sectional shapes of the plurality of prisms 43 are formed so as to be bilaterally symmetrical in the entire liquid crystal prism element 40. For facilitating the explanation, the region where the prisms 43 are formed is divided into left and right halves in FIGS. 1 and 2, the left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 50 is indicated by P1. The cross-sectional shape of the prisms 43 located in the region R1 and the cross-sectional shape of the prisms 43 located in the region R2 are designed so as to be symmetrical to each other about the plane P1 when seen on a plane parallel to an XZ plane, as shown in FIGS. 1 and 2.

The electrode 48a is formed in the region R1 of the inner surface of the substrate 41. The electrode 48b is formed in the region R2 of the inner surface of the substrate 41. Similarly, the electrode 49a is formed in the region R1 of the inner surface of the substrate 42, and the electrode 49b is formed in the region R2 of the inner surface of the substrate 42.

As the materials of the substrates 41 and 42 and the prisms 43, glass or resin can be used. When resin is used as the material of the prisms 43, the prisms 43 can be formed by, as an example, imprinting a UV-curing resin on a glass substrate. The liquid crystal prism element 40 can be produced by forming a one-dimensional array of the prisms 43 on the substrate 42 on which the electrodes 49a and 49b have been formed, then attaching together the substrate 42 and the substrate 41 on which the electrodes 48a and 48b have been formed, and injecting a liquid crystal between the substrates 41 and 42.

The liquid crystal prism element 40 is an element that is able to control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 45 has a birefringence property in which a refractive index is different for each polarization direction of incident light. In addition, when the direction of the longitudinal axis orientation (director) of each liquid crystal molecule relatively changes with respect to the polarization direction of light, the refractive index of the liquid crystal layer 45 also changes. Thus, when the orientation of the liquid crystal is changed by an electric field generated by applying a certain voltage, the refractive index for transmitted light changes, and hence a deflection angle which is a refraction angle of the light changes.

In the present embodiment, the liquid crystal prism element 40 is formed such that the liquid crystal molecules are oriented so as to be inclined at a predetermined angle in a state where no voltage is applied to the liquid crystal prism element 40. The orientations of the liquid crystal molecules will be described later.

In the present embodiment, the case where uniaxial positive type liquid crystal is used as the material forming the liquid crystal layer 45 will be considered. Then, the case where the longitudinal axes of the liquid crystal molecules are oriented in the Y axis direction when no voltage is applied between the substrates; and the longitudinal axes of the liquid crystal molecules are oriented in the Z axis direction when a voltage is applied between the substrates will be considered. It is noted that the liquid crystal molecules may be negative type liquid crystal.

In general, in the case where light is deflected by an active element such as the liquid crystal prism element 40, it is desirable to use a liquid crystal material having high $\Delta n$ (=refractive index $n_e$ for extraordinary light−refractive index $n_o$ for ordinary light), in order to increase a deflection angle. However, among commercially available materials, the number of liquid crystal materials having high $\Delta n$ is small, and $\Delta n$ is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, electric power, a switching speed.

It is noted that in the liquid crystal prism element 40, the inclination direction of each inclined surface of each prism 43 is different between the right and left sides of the center line of the screen (the plane P1). The liquid crystal prism element 40 has a property in which the efficiency of deflection toward a direction in which emitted light gets close to the inclined surface of each prism 43 is low as compared to that of deflection toward a direction in which emitted light becomes more distant from the inclined surface of each prism 43. Thus, when the inclined surfaces of the prisms 43 are made symmetrical about the plane P1 and are also made to face ahead of the center portion of the screen, the liquid crystal prism element 40 is able to efficiently deflect light incident near the left edge of the screen, toward ahead of the screen on the right, and is able to efficiently deflect light incident near the right edge of the screen, toward ahead of the screen on the left. In this case, different voltages are applied to the right and left regions of the liquid crystal prism element 40. Thus, the electrodes 49*a* and 49*b* are separated at the screen center. Alternatively, when both electrodes in the same substrate are used as ground terminals, the electrodes may not be separated at the center.

<4. Configuration of Image Display Panel>

Light transmitted through the liquid crystal prism element 40 is incident on the image display panel 50. The image display panel 50 displays an image or video. The image display panel 50 is composed of, for example, a liquid crystal panel. One example of the image display panel 50 is an in-plane-switching type panel. However, another type of image display panel can be used as the image display panel 50. Light transmitted through the image display panel 50 has directivity and is converged at the position of an eye of the observer.

<5. Configuration of Control Section>

The control section 60 controls the value of a voltage applied to the liquid crystal prism element 40, on the basis of the viewing position information calculated by the viewing position calculation section 72. More specifically, when the viewing position of the observer shifts from a position in front of the screen center to the screen left edge side as shown in FIG. 1, the light emitted from each prism 43 is deflected in the rightward direction as seen from the observer, by making the refractive index of the liquid crystal layer 44 lower than the refractive index of each prism 43 in the region R1 and making the refractive index of the liquid crystal layer 44 higher than the refractive index of each prism 43 in the region R2. At that time, the deflection angle in the region R1 and the deflection angle in the region R2 can be adjusted by making the voltage applied to the region R1 higher than a voltage applied when light is not deflected and making the voltage applied to the region R2 lower than the voltage applied when light is not deflected. In contrast, when the viewing position of the observer shifts from a position in front of the screen center to the right edge side, the light emitted from each prism 43 is deflected in the leftward direction as seen from the observer, by making the refractive index of the liquid crystal layer 44 higher than the refractive index of each prism 43 in the region R1 and making the refractive index of the liquid crystal layer 44 lower than the refractive index of each prism 43 in the region R2. At that time, the deflection angle in the region R1 and the deflection angle in the region R2 can be adjusted by making the voltage applied to the region R1 lower than the voltage applied when light is not deflected and making the voltage applied to the region R2 higher than the voltage applied when light is not deflected.

It is noted that the deflection angle of the liquid crystal prism element 40 and position information of a converged point of light with respect to an applied voltage can be assumed at the stage of designing, and thus it suffices to previously prepare data that associates an applied voltage with position information and to store the data in a storage unit provided in the image display apparatus 10. In addition, after completion of a product, calibration may be performed to correct the position of a light converged point.

<6. Configuration of Position Detection Section>

The position detection section 70 includes a camera 71 and a viewing position calculation section 72. The camera 71 takes an image of the observer in predetermined cycles. The viewing position calculation section 72 analyzes the image taken by the camera 71 and calculates viewing position information representing a viewing position of the observer. For image analysis performed by the camera 71, a known algorithm for recognizing the position of a face or a portion (eyes, nose, etc.) of a face can be used. In addition, the viewing position information calculated by the viewing position calculation section 72 preferably represents the positions of the eyes of the observer, but may represent the position of the face, the nose, or the like instead of the positions of the eyes.

<7. Details of Liquid Crystal Prism Element>

Next, the orientations of the liquid crystal molecules of the liquid crystal prism element 40 according to the present embodiment will be described. In the present embodiment, the liquid crystal molecules are inclined at a predetermined angle in a state where no voltage is applied to the liquid crystal prism element 40. In other words, the liquid crystal molecules are initially oriented in a state of being inclined at the predetermined angle.

Here, for facilitating the explanation, first, the case where the initial orientations are at 0 degree will be described with reference to FIGS. 3 and 4. Then, the case where the initial orientations are inclined at a predetermined angle will be described.

Figure 3:
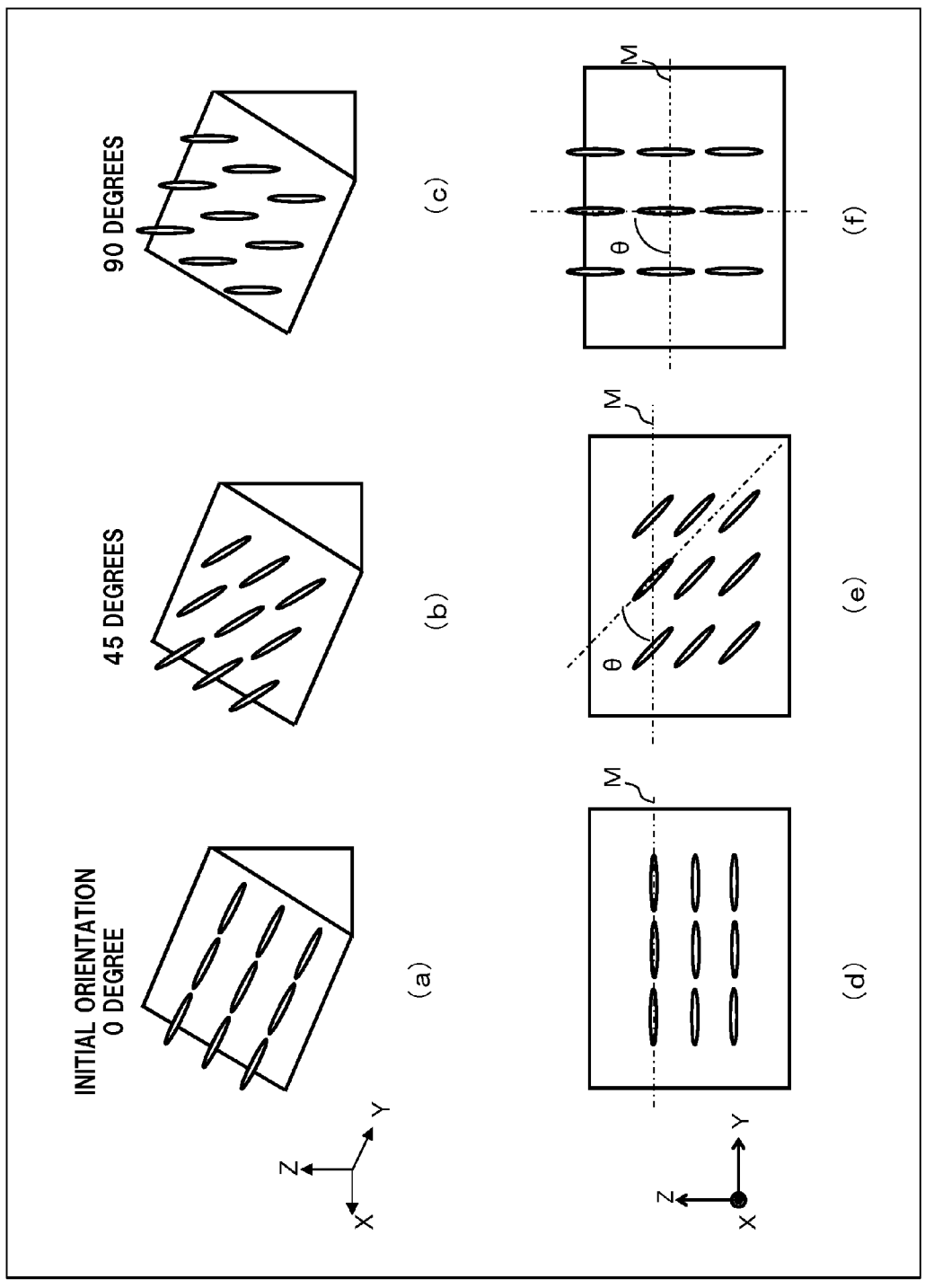
FIG. 3(a) is a schematic diagram showing a configuration provided when the orientations of liquid crystal molecules are at 0 degree.
FIG. 3(b) is a schematic diagram showing a configuration provided when the orientations of the liquid crystal molecules are at 45 degrees.
FIG. 3(c) is a schematic diagram showing a configuration provided when the orientations of the liquid crystal molecules are at 90 degrees.
FIG. 3(d) is a schematic diagram showing the configuration provided when the orientations of the liquid crystal molecules are at 0 degree.
FIG. 3(e) is a schematic diagram showing the configuration provided when the orientations of the liquid crystal molecules are at 45 degrees.
FIG. 3(f) is a schematic diagram showing the configuration provided when the orientations of the liquid crystal molecules are at 90 degrees.

FIG. 3 shows relationships between the liquid crystal molecules and the prism in the case where the orientations are at 0-90 degrees.

FIGS. 3(*a*) to 3(*c*) are schematic perspective views showing the relationship between the liquid crystal molecules and the prism. FIGS. 3(*d*) to 3(*f*) are schematic diagrams when the configurations in FIGS. 3(*a*) to 3(*c*) are seen from the X axis direction. A reference line M shown in FIGS. 3(*d*) to 3(*f*) is a line parallel to the Y axis. In other words, the reference line M is a line parallel to the longitudinal direction of the prism.

FIGS. 3(*a*) and 3(*d*) show a state where no voltage is applied to the liquid crystal layer. In other words, FIGS. 3(*a*) and 3(*d*) show the initial orientations of the liquid crystal molecules. As shown in FIG. 3(*d*), the liquid crystal molecules are oriented such that the long axes of the liquid crystal molecules are parallel to the reference line M. The initial orientation angle of each liquid crystal molecule at that time is defined as 0 degree.

FIGS. 3(*b*) and 3(*e*) show a state where a predetermined voltage is applied to the liquid crystal layer. As shown in FIG. 3(*e*), the liquid crystal molecules are oriented such that the long axes of the liquid crystal molecules are inclined at 45 degrees relative to the reference line M.

FIGS. 3(*c*) and 3(*f*) show a state where a higher voltage is applied to the liquid crystal layer. As shown in FIG. 3(*f*), the liquid crystal molecules are oriented such that the long axes of the liquid crystal molecules are inclined at 90 degrees relative to the reference line M.

Figure 4:
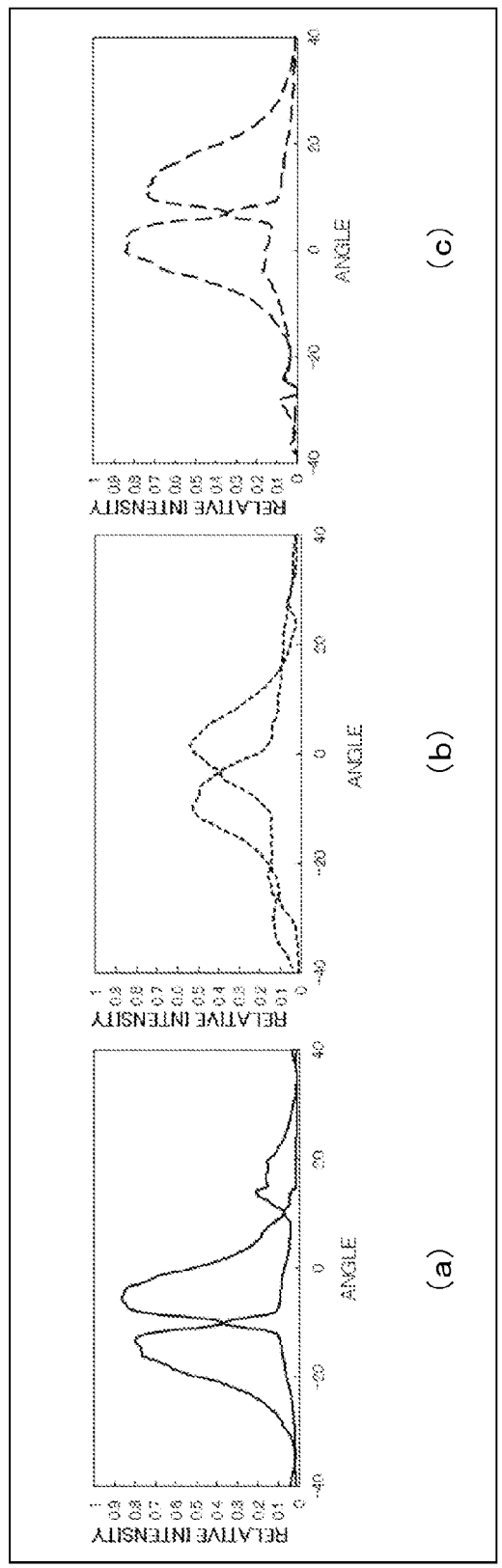
FIG. 4(a) is a graph showing the intensity of light obtained when the orientations of the liquid crystal molecules are at 0 degree.
FIG. 4(b) is a graph showing the intensity of light obtained when the orientations of the liquid crystal molecules are at 45 degrees.
FIG. 4(c) is a graph showing the intensity of light obtained when the orientations of the liquid crystal molecules are at 90 degrees.

FIG. 4 is graphs showing the orientation angle of light and a distribution of the intensity of the light. The horizontal axis of each graph indicates the emission angle of light emitted from the image display apparatus. The emission angle is defined as 0 degree when the light is orthogonal to the display surface of the image display apparatus. In addition, regarding the sign of the emission angle, an angle made by light deflected toward ahead of the image display apparatus on the right, relative to the normal line of the display surface, is defined as being positive.

When the observer views the image display apparatus at a position in front of the center of the image display apparatus, a peak of the emission angle of the light is generated near 0 degree. When the observer views the image display apparatus at a position in front of the left side of the image display apparatus (i.e., the right side for the observer), the light is deflected toward ahead of the image display apparatus on the left. Therefore, a peak is generated at the minus side of the angle on the horizontal axis. When the observer views the image display apparatus at a position in front of the right side of the image display apparatus (i.e., the left side for the observer), the light is deflected toward ahead of the image display apparatus on the right. Therefore, a peak is generated at the plus side of the angle on the horizontal axis. In addition, the vertical axis of each graph indicates a relative intensity of the light. In other words, the vertical axis indicates the ratio of the intensity of light emitted from the liquid crystal prism element to the intensity of light incident on the liquid crystal prism element. The relative intensity is defined as "1" when the entirety of the light incident on the liquid crystal prism element is emitted from the liquid crystal prism element.

FIG. 4(a) shows an intensity distribution of light in the state of FIGS. 3(a) and 3(d). When the observer views the image display apparatus at a position in front of the left side of the image display apparatus, the relative intensity of emitted light exhibits about 0.8 as shown in FIG. 4(a), and is sufficient for viewing.

FIG. 4(b) shows an intensity distribution of light in the state of FIGS. 3(b) and 3(e). When the observer views the image display apparatus at a position in front of the center of the image display apparatus, the relative intensity of emitted light is about 0.5 to 0.6 as shown in FIG. 4(b).

FIG. 4(c) shows an intensity distribution of light in the state of FIGS. 3(c) and 3(f). When the observer views the image display apparatus at a position in front of the right side of the image display apparatus, the relative intensity of emitted light is about 0.8 as shown in FIG. 4(c), and is sufficient for viewing.

As described above, in the case where the initial orientations of the liquid crystal molecules are at 0 degree, the relative intensity of the light is decreased when the observer is at a position in front of the center of the screen. In general, it is thought that the frequency with which the observer views at a position in front of the center of the screen is high, and thus it is inconvenient for the observer that the intensity of light is low at the center of the screen. Furthermore, a predetermined voltage is applied in order to orient the liquid crystal molecules, and thus the power consumption is increased.

As the cause for occurrence of such a phenomenon, the following reason is considered.

The liquid crystal molecules near the interface with the prism have the property of maintaining a state of the initial orientations. Thus, even when the liquid crystal molecules are attempted to be oriented at 45 degrees relative to the reference line M, the liquid crystal molecules near the prism interface are influenced by the initial orientations, and hence are not oriented at 45 degrees. As a result, the orientations of the liquid crystal molecules are different between in a portion near the prism and in a portion distant from the prism. Thus, a refractive index distribution is generated within the liquid crystal layer. The refractive index distribution depends on the shape of the prism. In other words, in a portion of a recess formed by the inclined surface of the prism and the wall surface of an adjacent prism, a refractive index distribution is generated so as to be gently curved along the shape of the recess. The curved portion has a concave lens function. Light passing through the curved portion is diffused by the concave lens function. As a result, light emitted from the liquid crystal prism element travels toward the observer side in a state where its directivity is lost. The light having lost its directivity (having been diffused) is not converged on the eyes of the observer, and thus the intensity of the light is decreased.

Thus, in the present embodiment, in the initial orientations, the liquid crystal molecules are inclined at a predetermined angle as described below.

Figure 5:
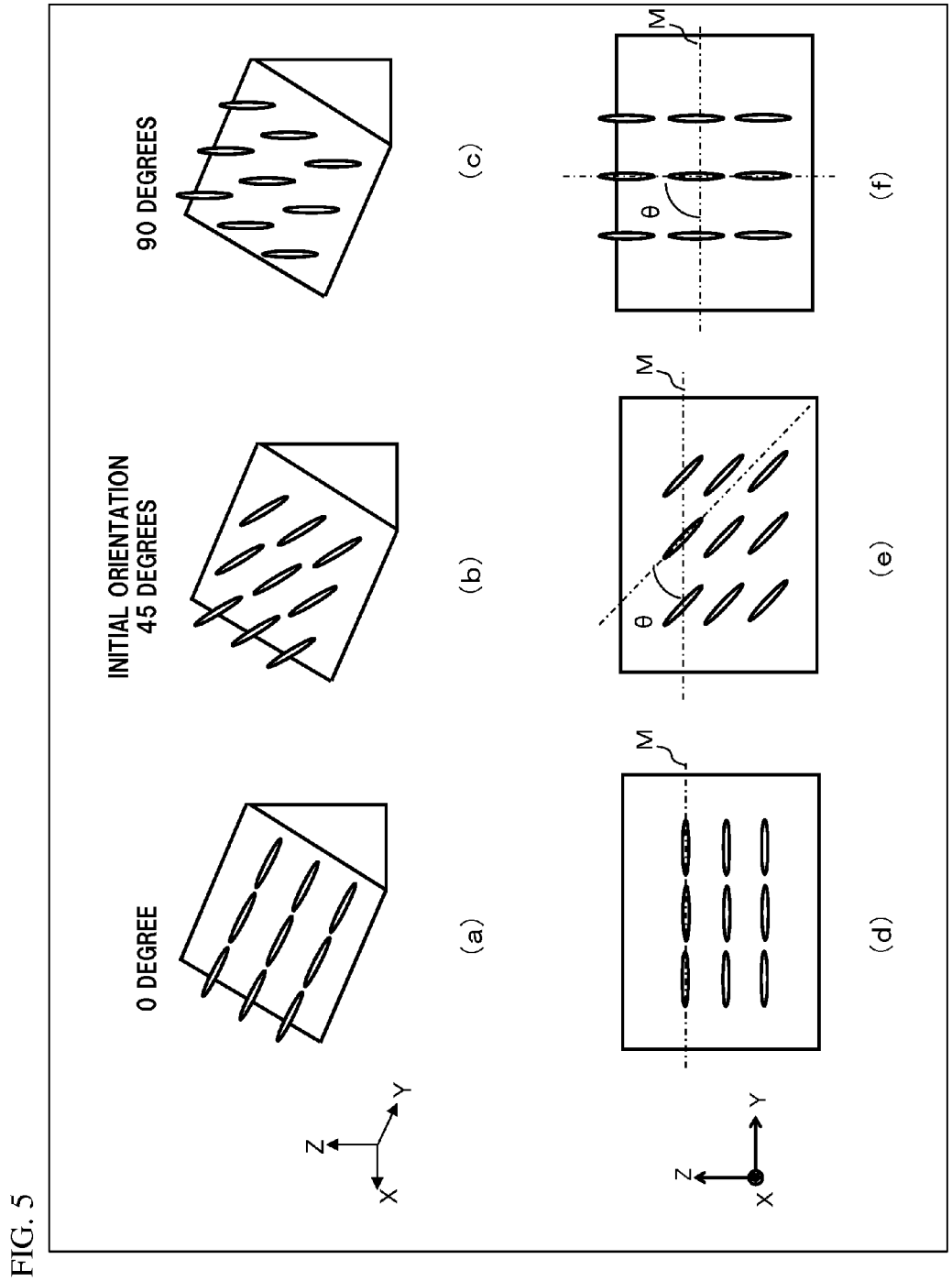
FIG. 5(a) is a schematic diagram showing a configuration provided when the orientations of the liquid crystal molecules are at 0 degree.
FIG. 5(b) is a schematic diagram showing a configuration provided when the orientations of the liquid crystal molecules are at 45 degrees.
FIG. 5(c) is a schematic diagram showing a configuration provided when the orientations of the liquid crystal molecules are at 90 degrees.
FIG. 5(d) is a schematic diagram showing the configuration provided when the orientations of the liquid crystal molecules are at 0 degree.
FIG. 5(e) is a schematic diagram showing the configuration provided when the orientations of the liquid crystal molecules are at 45 degrees.
FIG. 5(f) is a schematic diagram showing the configuration provided when the orientations of the liquid crystal molecules are at 90 degrees.

The orientations of the liquid crystal molecules according to the present embodiment will be described with reference to FIGS. 5 and 6.

FIGS. 5(a) to 5(c) are schematic perspective views showing a relationship between the liquid crystal molecules and the prism. FIGS. 5(d) to 5(f) are schematic diagrams when the configurations in FIGS. 5(a) to 5(c) are seen from the X axis direction. A reference line M shown in FIGS. 5(d) to 5(f) is a line parallel to the Y axis. In other words, the reference line M is a line parallel to the longitudinal direction of the prism.

FIGS. 5(a) and 5(d) show a state where a predetermined voltage (a first voltage) is applied to the liquid crystal layer. As shown in FIG. 5(d), the liquid crystal molecules are oriented such that the long axes of the liquid crystal molecules are parallel to the reference line M.

FIGS. 5(b) and 5(e) show a state where no voltage is applied to the liquid crystal layer. In other words, FIG. 5(b) shows the initial orientations of the liquid crystal molecules. As shown in FIG. 5(e), the liquid crystal molecules are oriented such that the long axes of the liquid crystal molecules are inclined at 45 degrees relative to the reference line M.

FIGS. 5(c) and 5(f) show a state where a predetermined voltage (a second voltage different from the first voltage) is applied to the liquid crystal layer. As shown in FIG. 5(f), the liquid crystal molecules are oriented such that the long axes of the liquid crystal molecules are inclined at 90 degrees relative to the reference line M.

Figure 6:
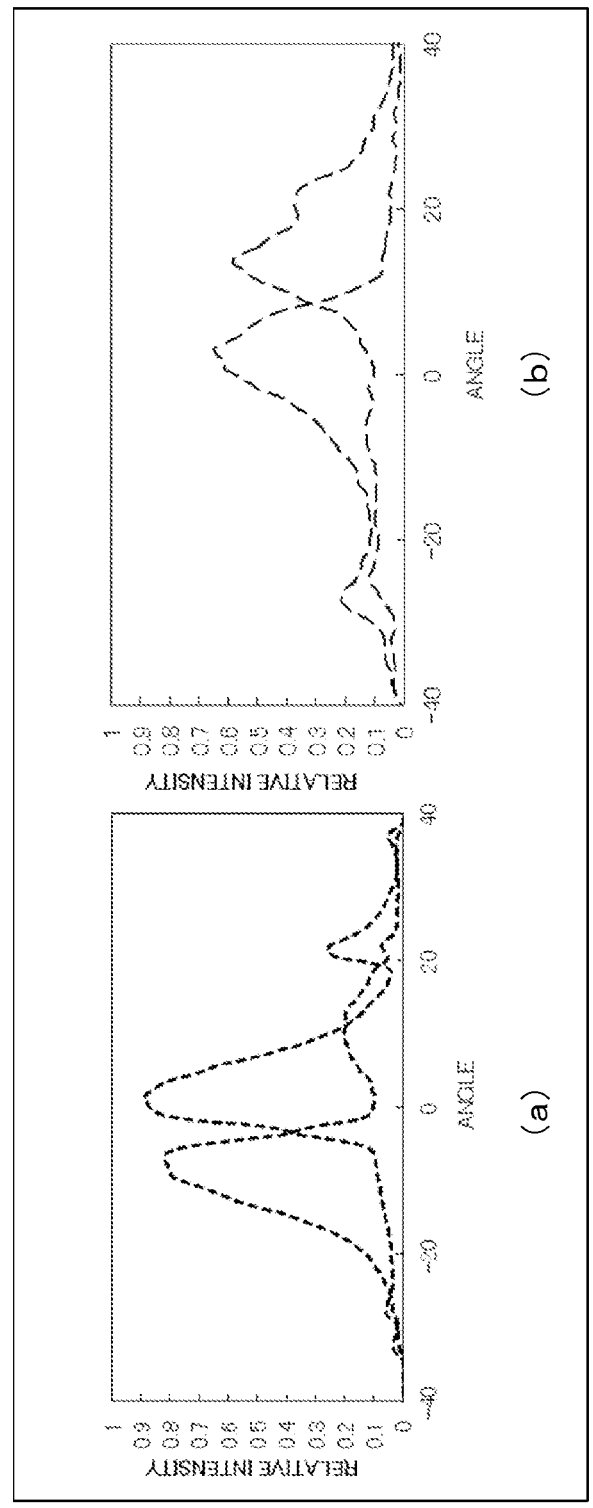
FIG. 6(a) is a graph showing the intensity of light obtained when the orientations of the liquid crystal molecules are at 45 degrees.
FIG. 6(b) is a graph showing the intensity of light obtained when the orientations of the liquid crystal molecules are at 90 degrees.

FIG. 6 is graphs showing the orientation angle of light and a distribution of the intensity of the light. FIG. 6(b) shows an intensity distribution of light in the state of FIGS. 5(c) and 5(f). When the observer views the image display apparatus at a position in front of the right side of the image display apparatus, the relative intensity of emitted light exhibits about 0.60 as shown in FIG. 6(b). The relative intensity is lower than the relative intensity shown in FIG. 4(c), but is sufficient for viewing. In addition, although a detailed description is omitted here, even when the observer views the image display apparatus at a position in front of the left side of the image display apparatus, an obtained relative intensity is similarly slightly lower than the intensity shown in FIG. 4(a), but is sufficient for viewing.

FIG. 6(a) shows an intensity distribution of light in the state of FIGS. 5(b) and 5(e). When the observer views the image display apparatus at a position in front of the center of the image display apparatus, the relative intensity of emitted light is about 0.85 as shown in FIG. 6(a). It is recognized that an intensity that is higher than the intensity shown in FIG. 4(b) is obtained.

As described above, in the present embodiment, the long axes of the liquid crystal molecules are inclined at a predetermined angle relative to the reference line M in a state where no voltage is applied to the liquid crystal layer. In other words, in the present embodiment, the initial orientations of the liquid crystal molecules are inclined at the predetermined angle relative to the reference line M. As a result, when the initial orientations are inclined at the predetermined angle, the intensity of light obtained when viewing at a position in front of the center of screen is higher than that when the initial orientations are at 0 degree. Since the liquid crystal molecules are initially oriented so as to be inclined at the predetermined angle, the liquid crystal molecules are naturally inclined in the same direction over the entirety of the liquid crystal layer. As a result, a refractive index distribution which is generated when the initial orientations are at 0 degree is not generated. Therefore, it is considered that the intensity of light emitted from the liquid crystal prism element is sufficiently increased. In addition, viewing at a position in front of the center of the screen is performed with the highest frequency. At the time of the viewing at a position in front of the center of the screen, the initial orientations can be maintained without applying a voltage, and thus the power consumption can also be reduced.

It is noted that for simplification of the explanation, the case where the initial orientation angle is 45 degrees has been described in the above embodiment, but the initial orientation angles of the liquid crystal molecules may not be 45 degrees. Specifically, the inclinations of the liquid crystal molecules in the initial orientations are preferably not less than 22.5 degrees and not greater than 67.5 degrees. When the inclinations of the liquid crystal molecules are not less than 22.5 degrees and not greater than 67.5 degrees, a sufficient intensity of light is ensured when viewing at a position in front of the center of the screen, and a sufficient brightness can be ensured by adjusting the angles of the liquid crystal molecules even when the observer moves to a position in front of the left or right edge of the image display apparatus.

In addition, the inclinations of the liquid crystal molecules in the initial orientations are further preferably not less than 40 degrees and not greater than 50 degrees. When the inclinations are set within such a range, a voltage applied to converge light toward ahead of the center of the screen can be reduced, and thus the power consumption can be reduced.

Next, a method for initially orienting the liquid crystal molecules such that the long axes of the liquid crystal molecules are inclined at the predetermined angle relative to the reference line will be described. Here, a description will be given on the assumption that the initial orientations of the liquid crystal molecules are at 45 degrees.

First, a reactive mesogen (polymerizable liquid crystal. Hereinafter, it is referred to merely as "RM") is prepared. The RM has the property of being cured when being irradiated with ultraviolet light. In addition, the RM is a material having at least a reactive mesogen group. The RM is mixed into liquid crystal. Then, a voltage is applied to the liquid crystal into which the RM has been mixed, to orient the liquid crystal molecules and the molecules of the RM at 45 degrees. In this state, ultraviolet light is applied to the liquid crystal into which the RM has been mixed. Thus, the RM molecules are cured in a state of being oriented at 45 degrees. The liquid crystal molecules have the property of being oriented while being influenced by a structure near the liquid crystal molecules. Therefore, the liquid crystal molecules come into a state of being inclined at 45 degrees along the orientations of the RM molecules. Accordingly, initial orientations at 45 degrees can be realized.

The RM is mixed into the liquid crystal in the above method, but a method may be used in which the RM is applied to the surface of a prism. After the RM is applied to the prism surface by spin coating, a voltage is applied such that the liquid crystal molecules and the RM molecules are oriented at 45 degrees. In this state, ultraviolet light is applied to the RM to cure the RM. Since the liquid crystal molecules are oriented while being influenced by a structure near the liquid crystal molecules as described above, the liquid crystal molecules are oriented at 45 degrees along the orientations of the RM molecules.

It is noted that the initial orientations of the liquid crystal molecules may be adjusted by using both the method in which the RM is mixed into liquid crystal and the method in which the RM is applied to a prism surface.

<Conclusion>

As described above, the liquid crystal prism element 40 (an example of a liquid crystal optical element) according to the present embodiment includes the prism array 44, the liquid crystal layer 45, and the electrodes 48 and 49.

The prism array 44 is composed of the plurality of prisms 43 that extend in the Y axis direction (an example of the first direction) and are arranged in the X axis direction (an example of the second direction).

The liquid crystal layer 45 is provided on the prism array 44.

The electrodes 48 and 49 are used for applying a voltage to the liquid crystal layer 45.

When the voltage applied to the liquid crystal layer 45 is 0 volt, the long axes of the liquid crystal molecules of the liquid crystal layer 45 are inclined at a predetermined angle relative to the Y axis in a YZ plane.

With such a configuration, a sufficient brightness can be ensured at the time of viewing at a position in front of the center of the screen, the viewing at a position in front of the center of the screen being performed with the highest frequency. In addition, a voltage applied to the liquid crystal layer can be reduced at the time of viewing at a position in front of the center of the screen, the viewing at a position in front of the center of the screen being performed with the highest frequency. Thus the power consumption can also be reduced as compared to the conventional art.

<Other Embodiments>

In the present embodiment, the light guide plate is shared by the light sources 21a and 21b. However, a light guide plate for the light source 21a and a light guide plate for the light source 21b may be provided so as to be laminated on each other.

In addition, instead of the light control film 30 in which the prisms and the lenticular lens are integrated, a prism sheet and a lenticular lens sheet may be individually provided.

Furthermore, the backlight 20 is not limited to have the configuration shown in FIGS. 1 and 2, and may have another configuration as long as it is able to alternately emit light for right eye and light for left eye in a time division manner in synchronization with switching between right and left image signals.

Furthermore, in the present embodiment, the directions of the inclined surfaces of the prisms 43 in the liquid crystal prism element 40 are made different between the regions R1 and R2, and the inclined surfaces of the prisms 43 are formed so as to be symmetrical about the plane P1. However, the directions of the inclined surfaces of the prisms may be uniform in the entire liquid crystal prism element 40. In this case, instead of providing the separate electrodes in the regions R1 and R2 of the liquid crystal prism element 40 as in the present embodiment, a single electrode is provided over the entire display screen. However, it is more preferred to provide the prisms 43 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 21a and 21b are constantly lit up instead of being alternately lit up. In addition to the case of displaying a three-dimensional image, also when a two-dimensional image is displayed, the displayed content can be prevented from being seen by surrounding people and privacy protection can also be improved, by following movement of the observer and projecting an image only on the eyes of the observer and the vicinity thereof in a reduced range.

The present disclosure is applicable to an image display apparatus displaying a stereoscopic image, and the like. Specifically, the present disclosure is applicable to display surfaces of a television, a personal computer, and a digital still camera, a display surface of a video camera, a display surface of a camera-equipped cellular phone, a display surface of a smart phone, a display surface of a tablet computer, and the like.

As presented above, the embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A liquid crystal optical element comprising:
   a prism array composed of a plurality of prisms that have ridge lines extending in a first direction and are arranged in a second direction orthogonal to the first direction;
   a liquid crystal layer provided on the prism array; and
   an electrode via which a voltage is applied to the liquid crystal layer, wherein
   when the voltage applied to the liquid crystal layer is 0 volt, long axes of liquid crystal molecules of the liquid crystal layer are oriented so as to be inclined at a predetermined angle relative to the first direction in a plane orthogonal to the second direction, and
   when the voltage applied to the liquid crystal layer is 0 volt, angles made by the long axes of the liquid crystal molecules relative to the first direction in the plane orthogonal to the second direction are not less than 22.5 degrees and not greater than 67.5 degrees.

2. The liquid crystal optical element according to claim 1, wherein the liquid crystal layer contains a material having at least a reactive mesogen group.

3. An image display apparatus including the liquid crystal optical element according to claim 1.

4. The liquid crystal optical element according to claim 1, wherein
   when the voltage applied to the liquid crystal layer is 0 volt, long axes of liquid crystal molecules of the liquid crystal layer have no the second-direction component.

5. The liquid crystal optical element according to claim 1, wherein
   when the voltage applied to the liquid crystal layer is 0 volt, the long axes of the liquid crystal molecules of the liquid crystal layer are obtained so as to be inclined at the predetermined angle relative to the first direction only in the plane orthogonal to the second direction.

6. The liquid crystal optical element according to claim 1, wherein
   long axes of all the liquid crystal molecules are inclined over the entirety of the liquid crystal layer.

7. An image display apparatus comprising:
   a light source;
   an image display having a display surface viewable by an observer; and
   a liquid crystal optical element,
   wherein the liquid crystal optical element is between the image display and the light source,
   wherein the liquid crystal optical element comprises:
      a prism array composed of a plurality of prisms that have ridge lines extending in a first direction and are arranged in a second direction orthogonal to the first direction;
      a liquid crystal layer provided on the prism array; and
      an electrode via which a voltage is applied to the liquid crystal layer, and
   wherein when the voltage applied to the liquid crystal layer is 0 volt, long axes of liquid crystal molecules of the liquid crystal layer are oriented so as to be inclined at a predetermined angle relative to the first direction in a plane orthogonal to the second direction.

* * * * *